Figure 1:
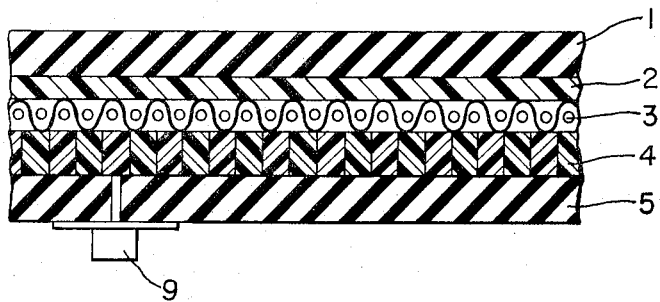

United States Patent [19]
Cook

[11] 3,801,425
[45] Apr. 2, 1974

[54] SELF-SEALING CONTAINER
[75] Inventor: Richard L. Cook, Flagstaff, Ariz.
[73] Assignee: Goodyear Aerospace Corporation, Akron, Ohio
[22] Filed: Mar. 22, 1971
[21] Appl. No.: 126,758

[52] U.S. Cl............... 161/190, 150/1 R, 161/251, 161/405, 220/63 A, 229/3.5
[51] Int. Cl...................... B32b 27/30, B32b 27/40
[58] Field of Search ............ 161/405, 190; 156/115, 156/333; 220/63 A

[56] References Cited
UNITED STATES PATENTS
1,436,985  11/1922  Friant .............................. 220/63 A
1,386,791  8/1921  Murdock ......................... 220/63 A
2,482,366  9/1949  Potters............................. 161/405 X
2,601,525  6/1952  Howald et al..................... 220/63 A FOREIGN PATENTS OR APPLICATIONS
590,053  4/1946  Great Britain..................... 161/405

OTHER PUBLICATIONS
"Hackh's Chemical Dictionary", J. Grant, 3rd Edition, McGraw-Hill Book Co., Inc., New York, Copyright 1944, page 382.

Primary Examiner—Clifton B. Cosby
Attorney, Agent, or Firm—F. W. Brunner; J. D. Wolfe

[57] ABSTRACT

A fuel container which pertains more particularly to lightweight fuel containers such as the gasoline and jet fuel cells employed in aircraft and which are self-sealing when punctured by missiles, the container comprising an elastomeric laminate having a sealant composition positioned in said laminate to effect sealing on contact with the fuel. The sealant composition is characterized as containing at least one fuel insoluble polymer dispersed in a solvent for said polymer, said solvent being pourable over a range of −65° F. to 300° F. and being miscible with the fuel at a temperature range of −65° F. to 300° F. to effect coagulation or precipitation of the fuel insoluble polymer from said composition.

10 Claims, 3 Drawing Figures

PATENTED APR 2 1974    3,801,425

INVENTOR.
RICHARD L. COOK
BY J.D. Wolfe
ATTORNEY

SELF-SEALING CONTAINER

This invention relates to a fuel container and pertains more particularly to lightweight fuel containers such as the gasoline and jet fuel cells employed in aircraft and which are self-sealing when punctured by missiles.

Fabric fuel containers having rubberized coatings are well-known and also self-sealing fuel tanks have been in use since World War II. The conventional self-sealing fuel tanks have depended upon the swelling action of the fuel upon a low degree of vulcanized natural or related rubbers to effect sealing of the opening caused by the penetration of the tank by a bullet or missile. Since appreciable time is required for the fuel to effect the swelling of the uncured rubber, it is desirable to have a sealing means that would act different than that obtained by the swelling action of fuel upon a natural rubber which is uncured or has a low degree of cure. Also, where the container is used in space, sealants which function by means other than the swelling action of the fuel is needed.

An object of this invention is to provide a method for sealing a puncture in a fuel cell by the action of the fuel to achieve a sealing action or by changing the sealant composition.

Figure 2:
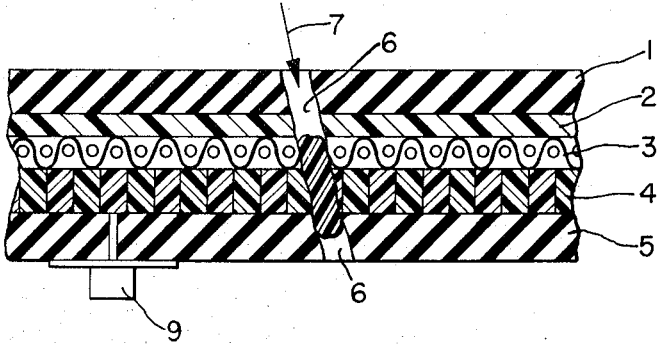
Figure 3:
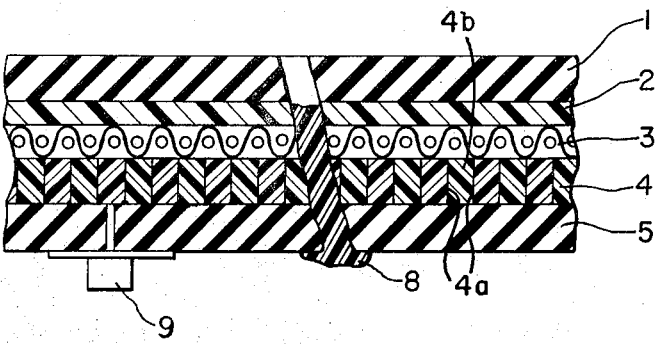

This object and others will be apparent from the drawing and description which follows wherein FIG. 1 is a cross-sectional view through a wall of the fuel tank; FIG. 2 is the same view showing the initial self-sealing action of the fuel on the liquid sealant in the puncture opening in the wall of the tank and FIG. 3 shows the final effect of the fuel in effecting sealing of the puncture opening.

Referring to the drawing, FIG. 1 shows the wall of a fuel cell wherein numeral 1 designates an elastomeric layer, numeral 2 designates a fuel barrier layer, numeral 3 designates a fabric layer, numeral 4 is the sealant layer and numeral 5 is the elastomeric outer layer or covering.

It should be evident from the above description of the nature of the wall of the fuel tank or container that it can be made in any of the usual manners wherein the elastomeric material is adhered to the fabric which contains a barrier coating such as nylon, polyvinylidene chloride, polybutadiene-acrylonitrile or the other well-known barrier materials. Then on the rubberized fabric or anywhere between the other layers within the wall of the container, there is applied a sealing layer 4 where the sealing layer comprises a solvent solution or dispersion of a sealant, the nature of which will be described in greater detail hereinafter. Then over the sealant layer there is applied a suitable elastomeric covering or coating.

Referring to FIG. 2 it will be noted that when a missile has passed through the wall of the container it leaves an opening 6 which permits the fuel to flow into and through the opening 6 in the manner designated by arrows 7. As soon as the fuel contacts the sealant layer 4 it begins to extract the solvent in the sealant layer to leave the sealant behind as an insoluble deposit or coagulant. Since the sealant layer is a fluid it will tend to flow into the bullet hole 6. As it flows into the opening under the pressure of the fluid in the sealant layer, the sealant in the opening will contact the fuel and this will cause the sealant material to be deposited throughout the perforate hole in the manner best seen in FIG. 3 and designated by numeral 8. Thus, this deposit will plug the bullet opening and stop the flow of fuel.

As indicated heretofore the method of building the fuel cells or containers of this invention will be those well known to the art except there will be a sealant layer 4 sandwiched in in the manner shown in FIG. 1. This sealant layer preferably comprises a solution of cellulose acetate in a solvent such as acetone or methyl ethyl ketone or the other sealant compositions described hereinafter. Other suitable sealant materials are polyvinyl chloride dissolved in cyclohexanone to give a solution which is relatively viscous but yet still flowable under the force of gravity. Another suitable sealant material is polymethyl methacrylate dissolved in methyl methacrylate.

It should be appreciated that when a fuel such as gasoline or the diesel fuels or the well-known jet fuels contacts the sealant materials in their solution or dispersions, the solvent such as the ketones for the plugging material are dissolved in the fuel to deposit the polymer as a coagulate or insoluble phase which may be a pulpy semi-rigid lump or a deposit. This deposit acts to plug the passageway through the wall of the fuel cell. Thus, as the fuel extracts the solvent and deposits the resins within the opening, this blocking material acts as a bridge to further strengthen and block the passage of the fuel through the opening.

A specific embodiment of this invention is shown in the drawings where the sealant layer is applied as a ply 4, each ply having walls 4a for separating the fluid sealant in respective sealant cavities or chambers 4b. The sealant plies can be preformed by techniques such as casting a polyurethane or nylon film on a mold of the contour of the ply with the chamber walls. Alternately, the plies may be formed by vacuum forming a thermoplastic sheet such as a polyurethane or a vinyl resin. Then the shaped ply 4 is adhered to the fabric layer 3 with a suitable cement depending on the nature of the ply. Over ply 4 is applied an elastomeric layer 5 and adhered thereto. Ply 5 has a fitting 9 positioned therein and in communication with the cavities of ply 4. Once ply 5 is applied then the fluid sealant can be added as by pouring into the cavities of ply 4 through fitting 9. Once the cavities of ply 4 are filled then the fitting 9 is closed to retain the sealant in the sealant ply.

Alternatively, the polyurethane spray coat in layers 1 and 5 is applied from a polyurethane reaction mixture containing 2 to 8 percent and preferably 3 to 6 percent of a pyrogenic silica such as Cab-O-Sil to permit coats to be applied in relatively thick passes (10–15 mils). Also, by this technique one or more plies of sealant can be applied to a fuel container.

Another technique for bonding the sealant layer to the adjacent layers between which it is sandwiched is to use a cement or adhesive such as the conventional rubber or foam cements, for instance, a polybutadiene polyol type polyurethane cement. Also, the various layers can be adhered by the natural adhesiveness of the prime coat of a polyurethane reaction mixture.

The following are representative examples to exemplify this invention where all parts and percentages are by weight unless otherwise designated.

EXAMPLE I

A fuel cell is constructed by applying a spray coat of a commercial sprayable polyurethane reaction mixture used to produce Cessna 180 Fuel Cells on a cardboard form having a polyethylene release coat. This spray coat is built up to about 20 mils and then a fuel barrier layer is applied by painting on a 1-3 mil coat of nylon from an ethanol-isopropanol solution of the nylon. A coat of 5-10 mils of the above sprayable polyurethane reaction mixture is applied to cover the nylon barrier. A shaped film of polyurethane formed on a mold of a foraminous plate to give the shaped film numerous raised portions is placed over the polyurethane barrier layers and then covered with a film of polyurethane containing a polyurethane adhesive to form the sealant layer 4 with the interconnecting cavities. The film of polyurethane had a valve fitting therein so the liquid sealant composition could be added to fill the cavities with sealant.

The sealant composition was a mixture of 85 percent diisopropyl benzene, 10 percent dibutyl phthalate or related alkyl phthalate with an alkyl radical of 2 to 20 carbon atoms and 5 percent polyethyl methacrylate. A spray coat of 5-10 mils of the above sprayable polyurethane may be applied over the film and cured to give a finished container.

Instead of the composition of 85 percent diisopropyl benzene, 10 percent dibutyl phthalate and 5 percent polyethyl methacrylate, mixtures of the following compositions on weight percent basis can be used, also:

93 to 80 percent diisopropyl benzene or alkyl benzenes of 1 to 20 carbon atoms,
2 to 10 percent dibutyl phthalate or related plasticizer
5 to 10 percent polymethacrylate Of course, those skilled in this art will appreciate that these percentages can be varied widely depending on the molecular weight of the polymethacrylate; usually those of about 100,000 to 35,000 in molecular weights will be used.

Other specific sealant compositions useful in this invention are 85 percent diisopropyl benzene, 10 percent dibutyl phthalate, 2.5 percent polyethyl methacrylate and 2.5 percent polystyrene, or 42.5 percent diisopropyl benzene, 42.5 percent dibutyl maleate, 10 percent dibutyl phthalate, 5 percent polyethyl methacrylate. Although diisopropyl benzene has been used to illustrate a preferred solvent for the polymers insoluble in fuel, it is appreciated that those solvents characterized by having a boiling point of at least about 300° F., a flash point of at least 160° F. and being fluid or flowable over a range of temperature of −65° F. to 300° F. and miscible with jet fuel or gasoline over a range of −65° F. to 300° F. can be used to dissolve the polymers insoluble or swellable in fuel to form sealant compositions containing from about 5 to 80 percent of said polymers, depending on the solvent and viscosity of the resulting sealant.

Representative fuel insoluble polymers having the characteristics above are polyalkyl methacrylate where the alkyl radical contains 1, 2, 3, 4, 5, 6 and up to about 10-18 carbon atoms, polyvinyl chloride, polyvinyl acetate, polyesters and soluble polyurethanes, cellulose acetate, cellulose propionate, cellulose butyrate, cellulose acetate butyrate, hydroxyethyl cellulose, cellulose triacetate, cellulose tripropionate and polyacrylates such as acryloid B-72. The highly swellable rubbers of the natural and diene type may be used, too.

The sealant compositions of this invention contain sufficient solvent to convert the fuel insoluble or swellable polymers into a fluid or flowable dispersion; usually about 25 to 95 percent of solvent is sufficient for this purpose. Preferably the solvent concentration is kept as low as possible and still get flowability. It is desirable to incorporate a small amount, usually about 0.5 to 10 percent of a fuel soluble or swellable polymer such as polystyrene in the sealant composition to control the rate of plugging in the missile hole or other puncture.

What is claimed is:

1. An elastomeric coated fabric self-sealing container for hydrocarbon fuel having at least one sealant ply positioned between elastomer plies, said sealant ply adopted to hold a flowable sealant composition, containing a sealing composition comprising at least one fuel insoluble polymer dispersed in a solvent for said polymer, said solvent being pourable over a range of −65° F. to 300° F. and being miscible with the hydrocarbon fuel at a temperature range of −65° F. to 300° F. to effect coagulation or deposition of the fuel insoluble polymer upon contact with fuels arising from occurrence of a puncture.

2. The container of claim 1 wherein the polymer is a polyalkyl acrylate with the alkyl radical containing from 1 to 18 carbon atoms.

3. The container of claim 1 wherein the sealant is a mixture of alkylbenzene, plasticizer and a rubbery polymer.

4. The container of claim 3 wherein the polymer is a polyalkyl acrylate having an alkyl radical having from 1 to 18 carbon atoms.

5. The container of claim 4 wherein the polymer is polymethacrylate.

6. The container of claim 5 wherein the solvent for the sealant is diisopropyl benzene and the plasticizer is an alkyl phthalate having an alkyl radical containing from 2 to 20 carbon atoms and wherein the sealant is a mixture of 93 to 80 percent diisopropyl benzene, 2 to 10 percent dibutylphthalate and 5 to 10 percent polymethacrylate.

7. The container in claim 1 wherein the sealant is fluid mixture flowable over a temperature range of −65° F. to 300° F. composed of a solvent having a boiling point of at least 300° F. and complete miscibility with a hydrocarbon fuel, a polymer soluble in the solvent over the range of −65° F. to 300° F. but only slightly soluble to insoluble in hydrocarbon fuel at −65° F. to 300° F. and a plasticizer for said polymer.

8. The container of claim 7 wherein the solvent is an alkyl benzene having an alkyl radical of 1 to 20 carbon atoms, and the polymer is a polyalkyl acrylate having an alkyl radical containing from 1 to 18 carbon atoms.

9. The container of claim 7 wherein the solvent is diisopropyl benzene, the polymer is polymethacrylate and the plasticizer is dibutylphthalate.

10. The container of claim 7 wherein the mixture contains 0.5 to about 10 percent of a fuel soluble polymer in addition to the fuel insoluble polymer.

* * * * *